United States Patent
Eppich

[11] Patent Number: 6,053,724
[45] Date of Patent: Apr. 25, 2000

[54] DOUBLE TOGGLE MECHANISM

[75] Inventor: Stefan Eppich, Arbing, Austria

[73] Assignee: Engel Maschinenbau Gesellschaft m.b.H., Schwertberg, Austria

[21] Appl. No.: 08/994,152

[22] Filed: Dec. 19, 1997

[30] Foreign Application Priority Data

Dec. 23, 1996 [AT] Austria ............................. A 2249/96

[51] Int. Cl.[7] ................................................. B29C 45/66
[52] U.S. Cl. ........................ 425/593; 100/282; 100/286; 425/451.6
[58] Field of Search ................................. 425/592, 593, 425/451.5, 451.6; 100/282, 286

[56] References Cited

U.S. PATENT DOCUMENTS

| | | | |
|---|---|---|---|
| 3,044,393 | 7/1962 | Kury | 100/286 |
| 3,719,445 | 3/1973 | Sindelar | 425/451.5 |
| 3,890,308 | 6/1975 | Collins | 425/451.6 |
| 5,330,347 | 7/1994 | Ten Vaarwerk | 425/451.6 |

*Primary Examiner*—James P. Mackey
*Attorney, Agent, or Firm*—Notaro & Michalos P.C.

[57] ABSTRACT

Double toggle mechanism for moving the moveable die platen (2) of an injection moulding machine, with a first operating lever (7a) for extending and moving the first toggle mechanism (3a), and with a second operating lever (7b) for extending and bending the second toggle mechanism (3b). In accordance with the invention, it is provided that between the two toggle mechanisms (3a, 3b) there is arranged a gear mechanism with a rotatably mounted gearbox (8), with a drive shaft (11) driven by a motor (12), and with a driven out-put shaft (9) arranged coaxially to the drive shaft, in that the first operating lever (7a) is connected in an articulated manner to the gearbox (8) or a part attached thereto, and in that the second operating lever (7b) is connected in an articulated manner to a part (10) fixed rigidly onto the driven out-put shaft (9).

13 Claims, 2 Drawing Sheets

DOUBLE TOGGLE MECHANISM

FIELD AND BACKGROUND OF THE INVENTION

The invention relates to a double toggle mechanism for moving the moveable die platen of an injection moulding machine, with a first operating lever for extending and moving the first toggle mechanism, and with a second operating lever for extending and bending the second toggle mechanism.

Double toggle mechanisms for driving the moveable die platen of an injection moulding machine, and finally for applying the required high degree of mould clamping forces are already known (for example from Austrian patents no. 396 903, no. 378 501, no. 365 119 and no. 356 831). The object of the invention is to provide a comparatively simple, space-saving and robust drive for the double toggle mechanism.

SUMMARY OF THE INVENTION

In accordance with the invention, this is solved in that between the two toggle mechanisms there is arranged a gear mechanism with a rotatably mounted gearbox, with a drive shaft driven by a motor, and with a driven out-put shaft arranged coaxially to said drive shaft, in that the first operating lever is connected in an articulated manner to the gearbox or a part attached thereto, and in that the second operating lever is connected in an articulated manner to a part fixed rigidly onto the driven out-put shaft.

With this construction, preferably an electric motor (although in principle other motors, for example a hydraulic motor) can drive the drive shaft of the gear mechanism. When extending and bending the two toggle mechanisms of the double toggle mechanism, the gearbox and the driven out-put shaft rotate in opposite directions in a spatially fixed reference system, and thus allow symmetrical extending and bending of the two toggle mechanisms.

Planetary gears are particularly suitable as gear mechanisms. Other gear mechanisms can be used, however, for example one in which the gearbox is provided with internal teeth, a box made from flexible material, connected to the drive shaft, and with external teeth, is arranged in the gearbox, and in the box there is arranged a non-circular, preferably elliptical, plate connected to the drive shaft, which when the box is deformed presses the external teeth of the box in places into engagement with the internal teeth of the gearbox, wherein the external and internal teeth are provided with a different number of teeth.

The motor can be aligned in different ways with respect to the gear mechanism. For example, it is possible to align the drive shaft of the motor coaxially to the drive shaft of the gear mechanism. It is then particularly advantageous when the motor housing is simply connected in a fixed manner directly to the gearbox, without the necessity of an additional support.

In order to further reduce the width of the construction, it is also possible to align the motor perpendicularly with respect to the gear mechanism. It is then more advantageous to mount the motor housing in a stationary manner. The transfer of power from the motor to the gear mechanism then takes place, for example, via two conical toothed wheels.

BRIEF DESCRIPTION OF THE DRAWINGS

Further advantages and details of the invention will be described in more detail with reference to the following description of the drawings.

DESCRIPTION OF THE PREFERRED EMBODIMENT

Figure 1:
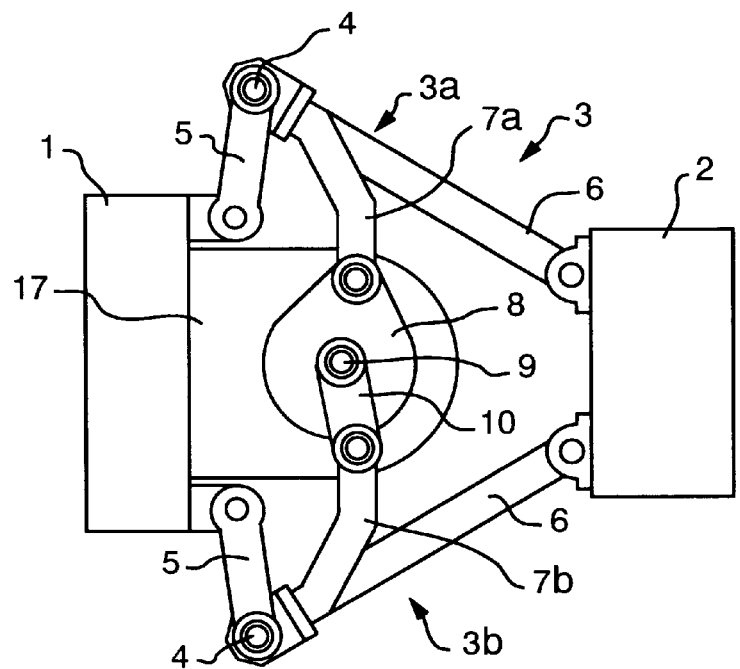
FIG. 1 shows a side view of an embodiment of the double toggle mechanism according to the invention in the bent position.
Figure 2:
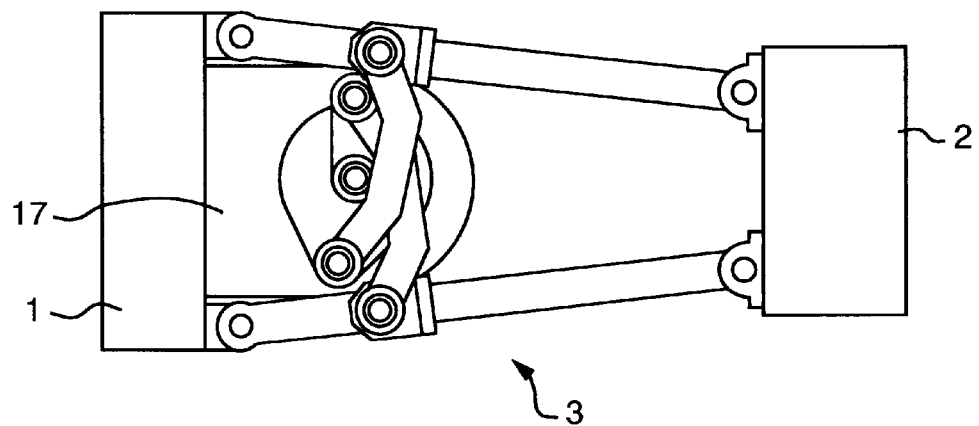
FIG. 2 shows the extended position.

In FIG. 1 a stationary end plate of the injection moulding machine is shown, labelled 1. The moveable die platen is labelled 2. As shown in FIGS. 1 and 2, the moveable die platen can be moved by means of the double toggle mechanism 3 in the longitudinal direction of the machine, and in this way the two mould halves, which are not shown, closed or opened. A large amount of clamping force can be applied by means of the double toggle mechanism in the extended position (FIG. 2). The double toggle mechanism 3 is provided, in FIG. 1, with an upper, first toggle mechanism 3a and, in FIG. 1, with a lower, second toggle mechanism 3b, which are constructed in a substantially symmetrical manner. Each of these two toggle mechanisms 3a and 3b is provided with two levers 5 and 6 connected via a hinged joint 4. The levers 6 are connected in an articulated manner to the moveable die platen 2, the levers 5 are connected in an articulated manner to the end plate 1. The operating levers 7a and 7b of the first and respectively the second toggle mechanisms 3a and respectively 3b, engage with the hinged joints 4.

In accordance with the invention, a gear mechanism is arranged between the two toggle mechanisms 3a and 3b, the gearbox 8 of which is rotatably mounted. In this embodiment, the reduction ratio is advantageously between 10:1 and 60:1, and particularly preferably between 20:1 and 25:1. The first operating lever 7a for the first toggle mechanism 3a is connected in an articulated manner to the gearbox 8. For the rest position of the drive lever 7a on the gearbox 8, the gearbox 8 can be provided with a small extension, as can be seen in FIGS. 1 to 4. It is possible to configure this extension integrally with the gearbox, but it is also possible, however, to fit a separate part on the gearbox, on which the operating lever 7a is then mounted in an articulated manner.

The operating lever 7b for the toggle mechanism 3b is mounted in an articulated manner on a part (lever 10) rigidly fixed to the output shaft 9 of the gear mechanism.

When the double toggle mechanism is extended from the position shown in FIG. 1 to the position shown in FIG. 2, the gearbox 8 rotates clockwise, while the output shaft 9 with the lever 10 moves anti-clockwise, in exactly the opposite direction.

Planetary gears are particularly suitable as gear mechanisms. However, other gear mechanisms with coaxial drive and output shafts are suitable in principle, for example a gear mechanism in which the gearbox is provided with internal teeth, in the gearbox there is arranged a box made from flexible material connected to the drive shaft, and with external teeth, and in the box there is arranged a non-circular, preferably elliptical, plate connected to the drive shaft, which when the box is deformed presses the external teeth of the box in places into engagement with the internal teeth of the gearbox, wherein the external and internal teeth are provided with a different number of teeth. Such gear mechanisms are commercially available under the name "Harmonic Drive".

Figure 3:
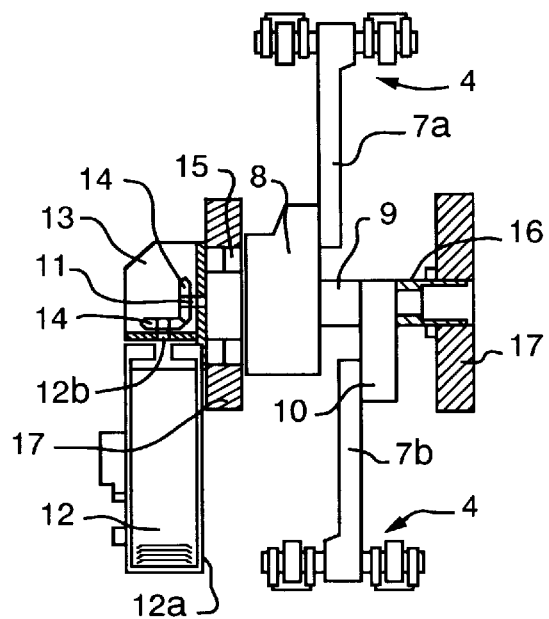
FIGS. 3 and 4 show two different embodiments of the double toggle mechanism according to the invention, viewed in the longitudinal direction of the injection moulding machine.

Electric motors are particularly suitable as motors, preferably servo-motors. A space-saving arrangement of the motor 12 is shown in FIG. 3. In this embodiment, the motor housing 12a is mounted in a stationary manner, preferably to a motor support 13, which can be connected in a fixed manner to the end plate of the injection moulding machine.

The drive shaft 12b of the motor 12 is at right-angles to the drive shaft 11 of the gear mechanism. The transfer of power takes place via conical toothed wheels 14.

Figure 4:
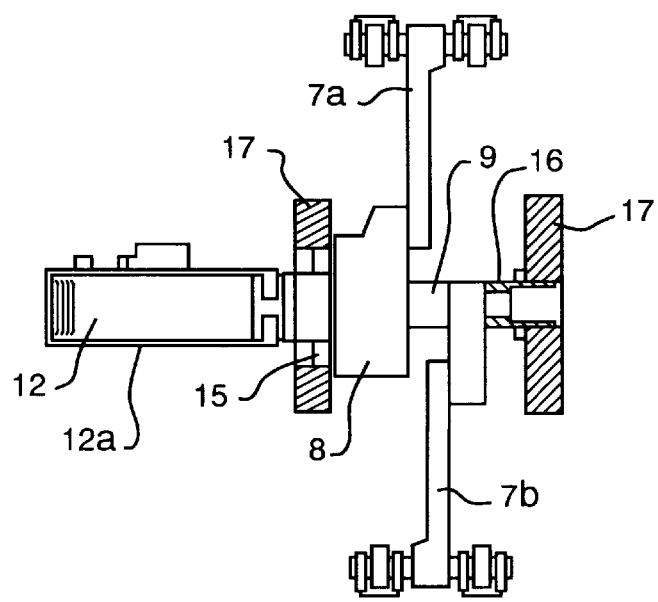

In the embodiment shown in FIG. 4, the motor 12 is aligned coaxially with respect to the drive shaft 11 of the gear mechanism, wherein with this embodiment, the motor housing 12a of the motor 12 is connected in a fixed manner to the gear box 8.

In the two embodiments according to FIGS. 3 and 4, the gearbox 8 is rotatably mounted in a first bearing 15, and the free end of the output shaft 9 is rotatably mounted in a second bearing 16. The two bearings 15 and 16 are preferably held by a fixing support 17 connected to the end plate 1.

What is claimed is:

1. Double toggle mechanism for moving a moveable die platen of an injection moulding machine, with a first operating lever for extending and moving a first toggle mechanism, and with a second operating lever for extending and bending a second toggle mechanism, the double toggle mechanism comprising:

a gear mechanism between the first and second toggle mechanisms; the gear mechanism having a rotatably mounted gearbox, a drive shaft driven by a motor, and a driven output shaft arranged coaxially to said drive shaft; the first operating lever being connected in an articulated manner to said gearbox or a part attached thereto; and the second operating lever being connected in an articulated manner to a part fixed rigidly onto said driven output shaft.

2. Double toggle mechanism according to claim 1, wherein the first and second toggle mechanism are each provided with two levers connected together in an articulated manner by means of a hinged joint, one of which levers is connected in an articulated manner to the movable die platen, and the other lever is connected in an articulated manner to a stationary end plate.

3. Double toggle mechanism according to claim 2, wherein the first and second operating levers engage directly with the hinged joints.

4. Double toggle mechanism according to claim 1, wherein the gear mechanism is a planetary gear.

5. Double toggle mechanism according to claim 1, wherein the gearbox is provided with internal teeth, a box made from flexible material, connected to the drive shaft, and with external teeth, is arranged in the gearbox, and in the box there is arranged an elliptical plate connected to the drive shaft, which when the box is deformed presses the external teeth of the box in places into engagement with the internal teeth of the gearbox, wherein the external and internal teeth are provided with a different number of teeth.

6. Double toggle mechanism according to claim 1, wherein the motor is an electric servo motor.

7. Double toggle mechanism according to claim 1, wherein the motor has a drive shaft, the drive shaft of the motor being aligned coaxially with respect to the drive shaft of the gear mechanism.

8. Double toggle mechanism according to claim 7, wherein the motor has a housing, the motor housing of the motor being connected in a fixed manner to the gearbox.

9. Double toggle mechanism according to claim 1, wherein the motor has a housing, the motor housing is mounted in a stationary manner to a motor support which is connected in a fixed manner to an end plate of the injection moulding machine.

10. Double toggle mechanism according to claim 9, wherein a drive shaft of the motor is arranged at right-angles to the drive shaft of the gear mechanism, wherein between the two drive shafts there is arranged a corner gear.

11. Double toggle mechanism according to claim 1, wherein the gearbox is rotatably mounted in a first bearing and a free end of the driven output shaft is rotatably mounted in a second bearing, wherein the two bearings are held by a fixing support.

12. Double toggle mechanism according to claim 1, wherein the reduction ratio of the gear mechanism, between the drive shaft and the driven output shaft is between 10:1 and 60:1 when the gearbox is stationary.

13. Double toggle mechanism according to claim 12, wherein the reduction ratio is between 20:1 and 25:1.

* * * * *